(12) United States Patent
Bergeron

(10) Patent No.: US 8,356,997 B1
(45) Date of Patent: Jan. 22, 2013

(54) INTELLIGENT TUTORING SYSTEM

(75) Inventor: Bryan Bergeron, Brookline, MA (US)

(73) Assignee: Accella Learning, LLC, Louisville, KY (US)

( * ) Notice: Subject to any disclaimer, the term of this patent is extended or adjusted under 35 U.S.C. 154(b) by 1031 days.

(21) Appl. No.: 12/328,018

(22) Filed: Dec. 4, 2008

Related U.S. Application Data

(60) Provisional application No. 61/012,615, filed on Dec. 10, 2007.

(51) Int. Cl.
*G09B 7/00* (2006.01)

(52) U.S. Cl. ........................................................ 434/323

(58) Field of Classification Search .................. 434/323, 434/350, 362, 365; 707/602, 625
See application file for complete search history.

(56) References Cited

U.S. PATENT DOCUMENTS

| | | | |
|---|---|---|---|
| 5,870,731 A | 2/1999 | Trif et al. | |
| 5,934,909 A | 8/1999 | Ho et al. | |
| 6,063,028 A * | 5/2000 | Luciano | 600/300 |
| 6,118,973 A | 9/2000 | Ho et al. | |
| 6,315,572 B1 | 11/2001 | Owens et al. | |
| 6,606,480 B1 * | 8/2003 | L'Allier et al. | 434/362 |
| 6,807,535 B2 | 10/2004 | Goodkovsky | |
| 6,832,069 B2 * | 12/2004 | Stout et al. | 434/353 |
| 6,839,724 B2 * | 1/2005 | Manchanda et al. | 707/625 |
| 7,052,277 B2 | 5/2006 | Kellman | |
| 7,082,418 B2 | 7/2006 | Levy et al. | |
| 7,095,979 B2 | 8/2006 | Stout | |
| 7,181,158 B2 | 2/2007 | Heller et al. | |
| 7,210,938 B2 | 5/2007 | Packard et al. | |
| 7,286,793 B1 | 10/2007 | Miele | |
| 7,493,077 B2 * | 2/2009 | Coleman et al. | 434/350 |
| 7,774,301 B2 * | 8/2010 | Johnson et al. | 707/602 |
| 7,822,768 B2 * | 10/2010 | Maymir-Ducharme et al. | 707/776 |
| 2003/0236796 A1 * | 12/2003 | Easter et al. | 707/104.1 |
| 2006/0234200 A1 * | 10/2006 | Rochedy | 434/323 |
| 2006/0240394 A1 | 10/2006 | Smith et al. | |
| 2006/0246411 A1 | 11/2006 | Yang | |
| 2007/0172808 A1 | 7/2007 | Capone | |
| 2007/0190505 A1 | 8/2007 | Hugonnard-Bruyere et al. | |

FOREIGN PATENT DOCUMENTS

| | | |
|---|---|---|
| JP | 5281899 | 10/1993 |
| WO | WO 2006/117498 | 11/2006 |

OTHER PUBLICATIONS

Abstract of Caballe, S. et al., "Using a grid platform for enabling real time user modeling in on-line campus," IEEE Comput. Soc., 2007 5th International Conference on Complex Intelligent and Software Intensive Systems, Los Alamitos, CA (Apr. 10-12, 2007).

Excepts from funding proposals related to Intelligent Tutoring Technology, Accella Learning LLC, Proposal No. A074-003-0102, pp. 1-28.

* cited by examiner

*Primary Examiner* — Xuan Thai
*Assistant Examiner* — Peter Egloff
(74) *Attorney, Agent, or Firm* — Frost Brown Todd LLC

(57) ABSTRACT

An intelligent tutoring system can be implemented using filters, predictive modeling, and a knowledge warehouse, which allows content to be dynamically selected for individualized presentation to a learner. Such an intelligent tutoring system can be implemented using a variety of techniques, including polynomial vector equations in modeling, extensible markup language storage formats for presentation data, and a knowledge warehouse with information stored in data cubes.

5 Claims, 10 Drawing Sheets

KW Example
MEDICAL MANAGEMENT OF RADIATION INCIDENTS

COMPETENCIES

Knowledge:

Vocabulary:
        Psychology:      501
             A1. Risk         502
             A2. Risk perception

Physics
            Radiation:
                 B1. Radiological accident
                 B2. Radiation
                 B3. Radioactivity
                 B4. Ionization

Radiological Preparedness:
                 C1. Exposure
                 C2. Contamination
                 C3. Internal contamination
                 C4. Radionuclide incorporation
                 C5. Protection
                 C6. Detection and Monitoring
                 C7. Contamination Control
                 C8. Instrumentation

Biology:
        Radiation:
             D1. Biological effects

---

Discussion:
    Psychology:
             F1. Risk
             F2. Risk perception

Physics:
        Radiation:
             G1. Radiological accident

FIG. 5a

G2. Radiation
G3. Radioactivity
G4. Ionization

Radiological Preparedness:
H1. Exposure
H2. Contamination
H3. Internal contamination
H4. Radionuclide incorporation
H5. Protection
H6. Detection and Monitoring
H7. Contamination Control
H8. Instrumentation
H9. Radiation consequences

Biology:
  Radiation:
    Biological Effects:
    I1. Ionizing Radiation
    I2. Psychology

Treatment & Management:
    J1. Scene
    J2. Hospital
    J3. Decontamination
    J4. Determine Isotope
    J5. Diagnosis
    J6. Treatment

Regulations:
  Radiation:
    Exposure:
    K1. Goal       503
    K2. Limits

Planning:
  Radiation event:
    L1. Responses
    L2. Injuries
    L3. Facilities
    L4. Staffing
    L5. Supplies

Skill:

FIG. 5b

Radiation:
  Radiological Preparedness:
    Select detection instruments in simulated incident:
      M1.

Use detection instruments in simulated incident:
      N1.

Select appropriate treatment of radiation victim:
      O1.

Prepare treatment of radiation victim:
      P1.

Treat radiation victim:
      Q1.

Select appropriate decontamination of radiation victim:
      R1.

Prepare for decontamination of radiation vicitm:
      S1.                            504

Decontaminate radiation victim:
      T1.

Perform contamination control techniques during emergency care of radiological victims:
      U1.

FIG. 5c

INTELLIGENT TUTORING SYSTEM

CROSS REFERENCE TO RELATED APPLICATIONS

This application hereby claims priority from U.S. provisional application No. 61/012,615, entitled Intelligent Tutoring System, which was filed on Dec. 10, 2007.

The U.S. Government has a paid-up license in this invention and the right in limited circumstances to require the patent owner to license others on reasonable terms as provided for by the terms of contract No. W81XWH-05-2-0017 awarded by the U.S. Department of Defense.

FIELD

Certain aspects of the teachings of this disclosure can be implemented in the field of software aided training.

SUMMARY

This document comprises a disclosure of various techniques and tools which can be used for training individuals and storing information related to those individuals' educational achievement. As will be apparent to one of ordinary skill in the art in light of this disclosure, the teachings of this disclosure can be utilized in a variety of different implementations. Set forth in this summary are certain features which may be present in implementations of the teachings of this disclosure. Additionally, for the sake of clarity, this summary includes explicit definitions for terms which should be understood as having particular meanings when used in the claims. Of course, it should be understood that the implementations identified herein are intended to provide examples only of aspects of implementations which could be created based on this disclosure, and are not intended to indicate limits on potential implementations which are covered by the claims in this document.

EXPLICIT DEFINITIONS

When used in the claims, "based on" should be understood to mean that something is determined at least in part by the thing that it is indicated as being "based on." When something is completely determined by a thing, it will be described as being "based EXCLUSIVELY on" the thing.

When used in the claims, a "computer" should be understood to refer to a device or group of devices which is capable of performing one or more logical and/or physical operations on data to produce a result.

When used in the claims, "computer executable instructions" should be understood to refer to data, whether stored as hardware, software, firmware, or some other manner, which can be used to specify physical or logical operations to be performed by a computer.

When used in the claims, "data" should be understood to refer to information which is represented in a form which is capable of being processed, stored and/or transmitted.

When used in the claims, "data structure" should be understood to refer to an organization used for storing data so that the data can be accessed and processed in appropriate ways. The term "data structure" can also refer to concrete embodiments of the same (e.g., both a class and an instance of the class).

When used in the claims, a "database" should be understood to refer to an organized collection of data.

When used in the claims, "local memory" should be understood to refer to a device for storing data which is in a location physically proximate (i.e., accessible without communicating through a network) to the device or devices which retrieve that data. Examples of local memory include random access memory (RAM), flash drives, hard disks, and CD-ROMs.

When used in the claims, "metadata" refers to data which functions as a description or definition for some other data.

When used in the claims, "metadata scheme" refers to an organization or structure for information in a database which is expressed through metadata (though that metadata can also include other information besides the scheme).

When used in the claims, "module" refers to a set of data, including computer executable instructions, which is used to configure a computer to perform a specific task or function.

When used in the claims, "reflecting," in the context of information "reflected" in data, should be understood to indicate that the information "reflected" can be retrieved from the data, even though the information may not be explicitly specified by the data (for example, actual numeric data values, as well as information about those values determined by the order in which they are stored in a medium would be considered to be "reflected" in the data).

When used in the claims, "set of computer executable instructions" should be understood to refer to an identifiable group of computer executable instructions. Examples to illustrate the meaning of a "set of computer executable instructions" include a program, and modules within a program.

When used in the claims, "set of data" should be understood to refer to an identified grouping, category or class or data. Examples to illustrate the meaning of a "set of data" include files, and instantiated classes.

DESCRIPTION OF THE DRAWINGS

The drawings and detailed description which follow are intended to be illustrative and are not intended to imply limitations on the scope of potential implementations of the disclosure set forth herein.

FIGS. 5*a*-5*c* show a structure which could be used in the organization of data in a competency database.

DETAILED DESCRIPTION

The following description should not be understood as being limiting on the scope of any claims included in this application, or in any application claiming priority from this application. Other potential applications and embodiments of the teachings of this disclosure beyond those explicitly set forth herein are contemplated by the inventors, and could be implemented by those of ordinary skill in the art without undue experimentation. Accordingly, the drawings and descriptions should be regarded as illustrative in nature and not limiting.

Figure 1:
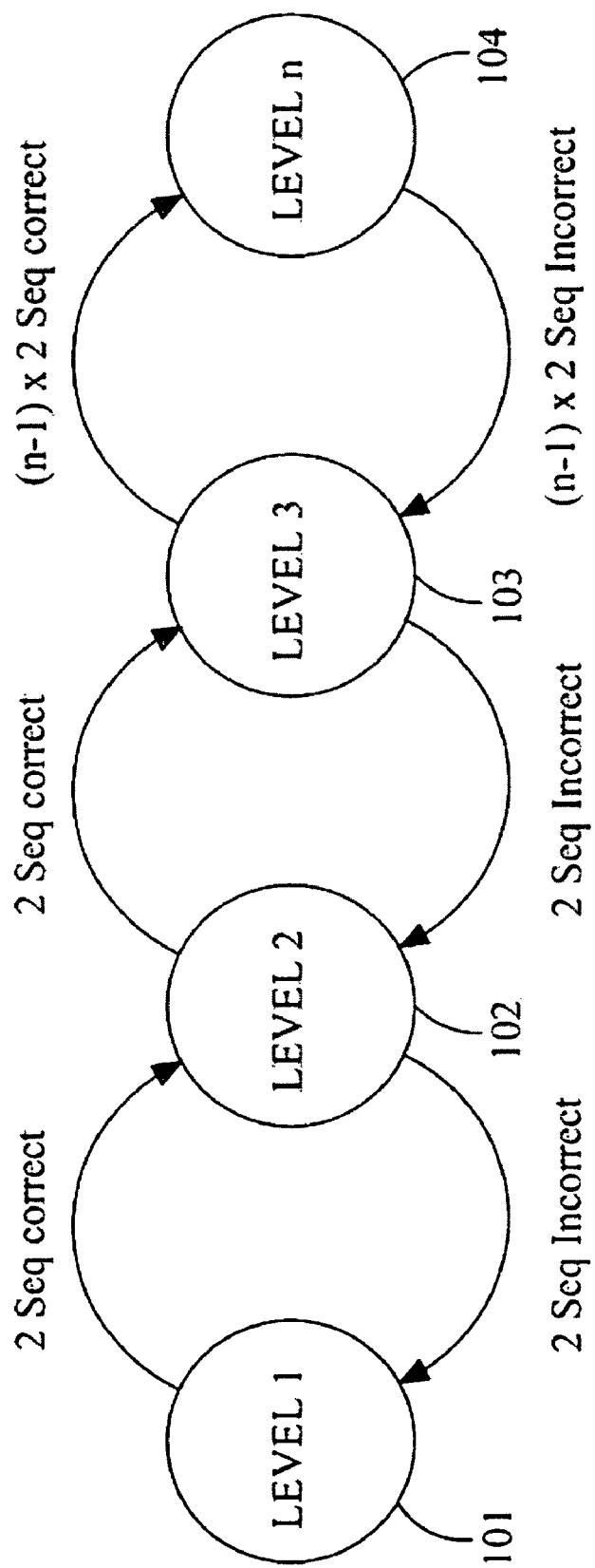
FIG. 1 depicts a state diagram.

As an illustration of one possible implementation of certain teachings of this disclosure, consider the diagram of FIG. 1. That figure depicts a state diagram in which a plurality of levels [101] [102] [103][104] represent different categories of content (e.g., test questions, instructional segments, etc.) which could be presented to a learner using an intelligent tutoring system. As shown in FIG. 1, it is possible for a learner to move between levels in both ascending (e.g., level 1 to level 2) and descending (level 2 to level 1) order, depending on inputs provided by the learner. In this way, content can be dynamically tailored for particular individuals being trained. For example, material presented might be organized into a series of articles and accompanying comprehension questions. A tutoring session could begin with presentation of the most basic articles to the user, then, as the user indicates comprehension of the material in those articles (e.g., by correctly answering the accompanying questions) material of increasing complexity could be presented to the user. Similarly, if a user indicates that he or she is having difficulty with a particular subject (e.g., by incorrectly answering questions related to that subject), the user could be presented with material having lesser complexity. In this manner, a system can be implemented that ensures that the material presented to a user is appropriately matched to that user's knowledge and skill level, and which could also modify the amount and content of material which was presented to the learner (e.g., a learner with more advanced knowledge might be presented with less material than a learner who requires more basic instruction to attain mastery of a concept).

Of course, it should be understood that the description above is not intended to be an exhaustive description of potential uses for a system which allows user state transitions such as shown in FIG. 1. For example, in some cases, instead of (or in addition to) allowing a learner to transition between levels which vary in complexity, it might be possible to allow users to transition between levels that vary in other manners, such as in terms of presentation modality, or learning style. Thus, if a learner's input indicates that he or she is a kinesthetic, rather than a visual learner, the content presented to that learner might be varied so as to be more appropriate to that individual's learning style. Similarly, instead of (or in addition to) receiving user inputs in the form of answers to questions, a system which allows user state transitions such as described in the context of FIG. 1 could receive input in the form of measurements of how long a user spends on a particular section of content or whether a user interacts with any particular aspect of a section of content. In some instances, specialized hardware might be utilized to facilitate this measurement. For example, a camera might track eye movement and/or expression to determine an individual's focus and comprehension level vis-à-vis various parts of presented content.

As yet another variation on the concept of user state transitions, it is also possible that a variety of techniques for utilizing user inputs could be implemented in different situations. For example, while FIG. 1 depicts transitions based on actual inputs provided by the user, other approaches to transitions—such as transitions based on predictive modeling—are also possible. As an example of the use of predictive modeling for state transitions, consider the (extremely simplified) scenario in which a learner's expertise is modeled with the formula $$c = k + v_w t$$

where c is the learner's expertise, $v_w$ is the weighted velocity of learner expertise in score change per hour, k is the learner's initial level of expertise, and t is the time in hours. In such a case, the learner's expertise (hence the appropriate material to present to the learner) can be predicted as a linear function increasing with time. By using this model, the appropriate information can be presented to the learner despite the possibility of inaccurate or missing user input data. Of course, the simplified formula set forth above is not intended to imply that modeling for state transitions is limited to linear expertise increase situations. As an alternative, nonlinear formulae, such as $$c = 0.1t^3 + 1.0143t^2 + 0.6571t + 41.0114,$$

the more general form $$c = p_1 t^n + p_2 t^{n-1} + p_3 t^{n-2} + \ldots + p_{n-1} t + p_n$$

or any other type of formula (e.g., a polynomial vector student model) could also be used.

Figure 2:
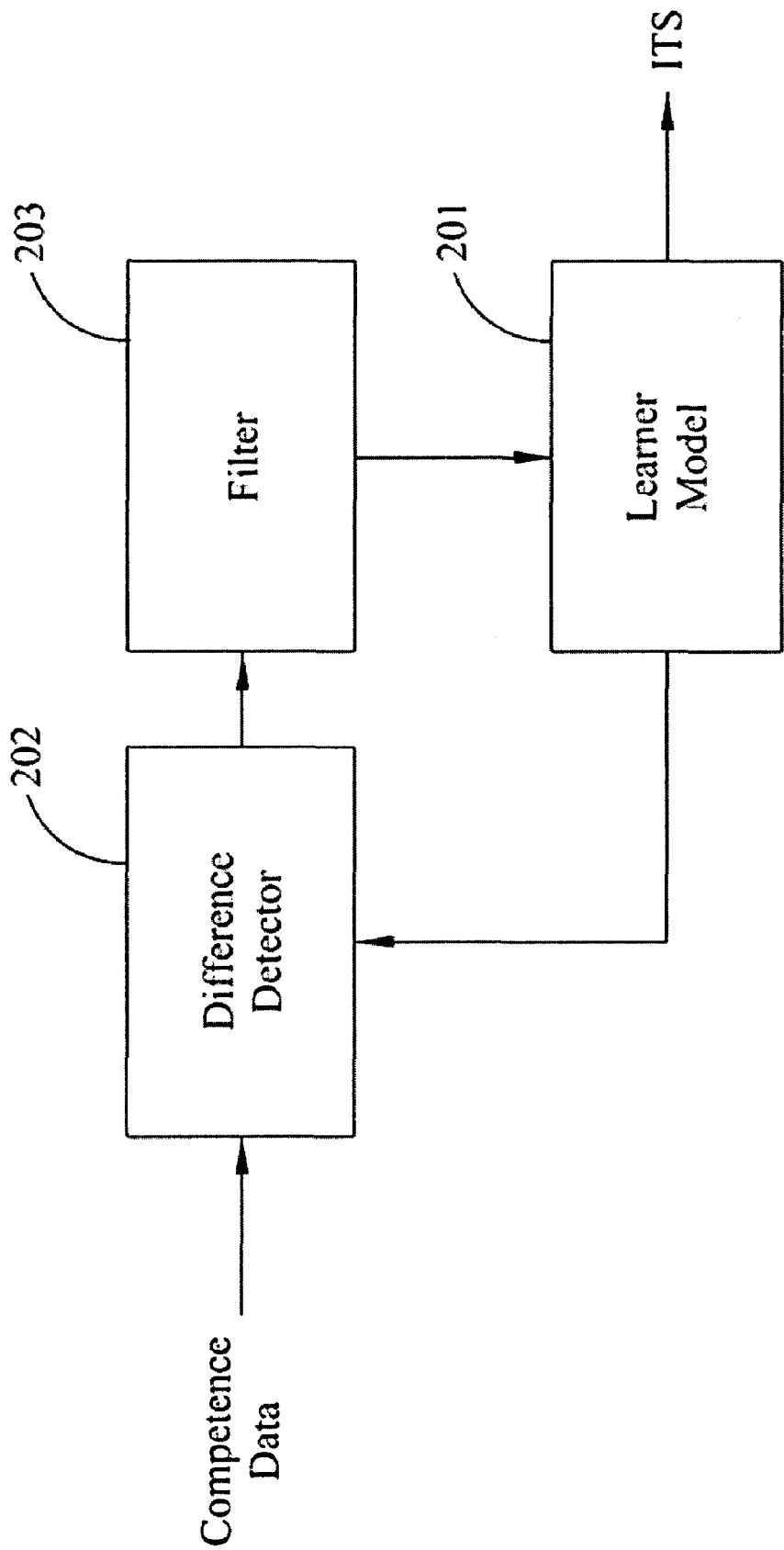
FIG. 2 depicts a closed-loop system which provides feedback to a learner model.

As yet a further refinement, in some cases combinations of transitions based on learner input and predictive modeling could also be used. For example, it is possible that transitions between states could be controlled by a model, and that user input is also gathered, and used as feedback for improvements and modifications to that model. As a demonstration of one potential approach to this technique, consider the diagram of FIG. 2. In FIG. 2, the output of a learner model [201] is sent to other components in an intelligent tutoring system which can be used to control transition between states and information presented to the learner. The output of the learner model [201] is also sent to a difference detector [202] which can compare the output of the learner model [201] with inputs from the learner (e.g., competence data). The output of the difference detector [202] can then be passed to a filter [203] which can be implemented as a software module configured to determine how the difference between predicted and real results should be used to modify the underlying learner model [201]. Accordingly, in some implementations a learner model [201] could be dynamically refined based on user input data.

Various techniques can be used for refining the learner model [201] in closed loop systems such as shown in FIG. 2. For example, it is possible that techniques such as minimizing either the weighted or unweighted measure of the distance between predicted and measured values could be implemented using the following formula:

$$S = \sum_{i=1}^{n} w_i (y_i - f(x_i))^2$$

Where S is the weighted sum of the squares of the distances between the predicted and measured values, $w_i$ is the weight for data point i, $y_i$ is the measured value for data point i, and $f(x_i)$ is the predicted value for data point i. In such a case, to obtain an unweighted sum, the value $w_i$ would be 1 for each measurement. Further refinements, such as the use of various types of Kalman Filter (including Classic Kalman Filters, Complementary Kalman Filters, Extended Kalman Filters, and Unscented Kalman Filters) can also be implemented. Additionally, it is also possible that implementations which use both modeling and measurements could be created using techniques other than those set forth above (e.g., neural or Bayesian networks), which may or may not include separate filtering as a part of feedback. Accordingly, the discussion above of various types of modeling, state transition, filtering and feedback implementations should be understood as being illustrative only, and not limiting on any claims included in this application or any application claiming priority from this application.

Of course, it should be understood that, in addition to variations between transitioning techniques, different implementations of the teachings of this disclosure might also include different approaches to integrating the state-transition concept. For example, in some cases, an implementation might include a single scale (e.g., complexity of material, or progression through cumulative material) to be presented to a user. However, in other situations, there might be multiple different areas of knowledge or aspects of content contained in a set of material to be presented to a learner, and each of those areas of knowledge might have different transition characteristics, or be represented by a different state machine in the system which controls presentation. As a concrete example of this, consider a situation where a learner is to be instructed in the medical management of radiation incidents. As shown in FIGS. 5a-5c, there might be a variety of areas of learning (competencies, such as vocabulary related to the psychology of risk [501] and risk perception [502], regulations regarding radiation exposure limits [503], steps for decontaminating a victim [504], etc) which could be considered relevant to the overall subject matter of the material presented to the learner. In a situation where individual competencies are uniquely modeled, the learner might be presented with information in one competency (e.g., the physics of radioactivity) which are appropriate for a high level of skill, while being presented with more basic information in one or more other competencies (e.g., the biological effects of radiation). In this way, fine grained optimization of information presented to a learner can be achieved, and the overall effectiveness and efficiency of the learning process can be increased.

Figure 6:
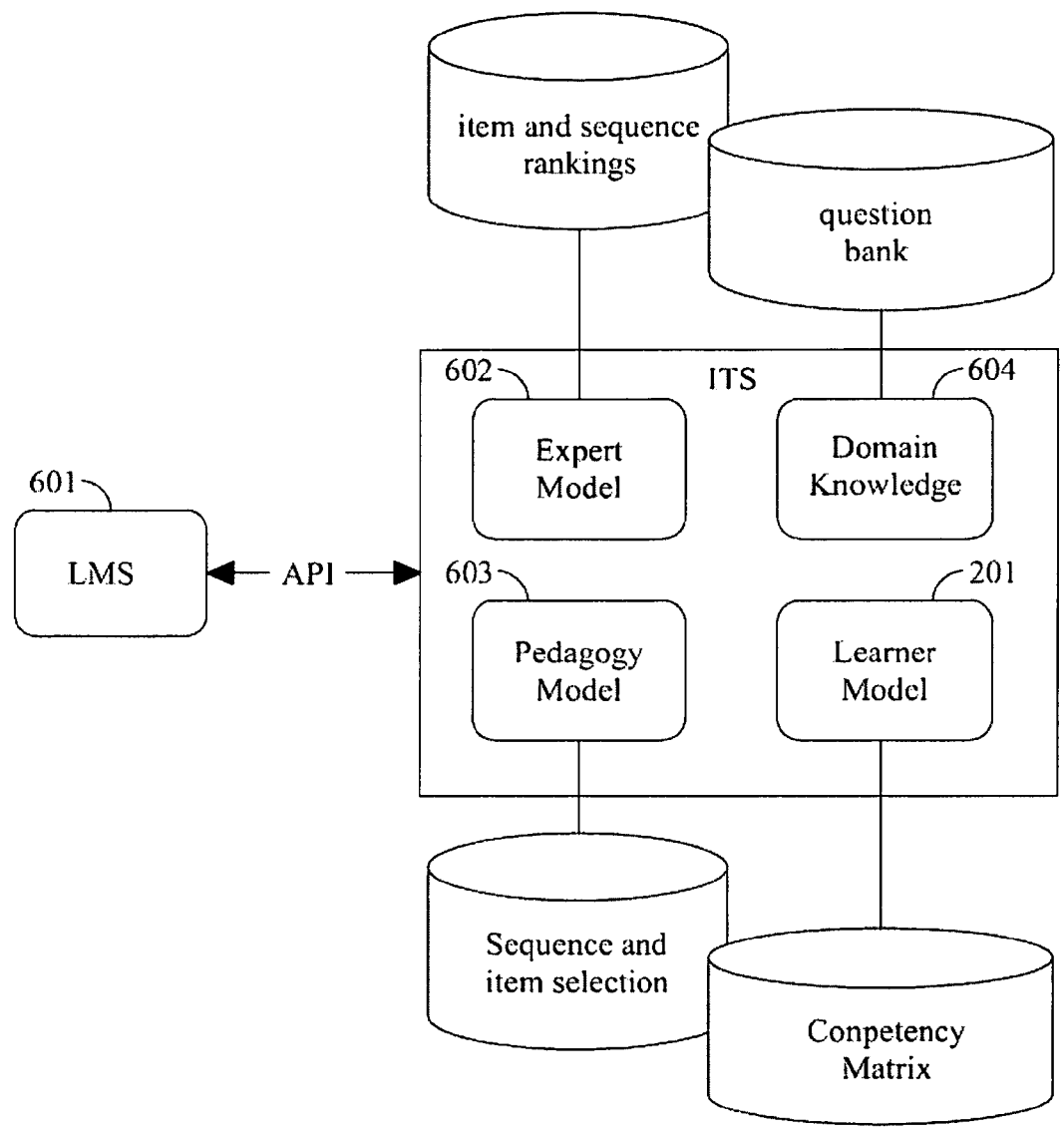
FIG. 6 depicts a set of components which could be used to control the operation of a learning management system (LMS).

As a concrete example of a system which could allow for the dynamic selection of material presented to a learner, consider the diagram of FIG. 6. FIG. 6 depicts a system which could be used to control the operation of a learning management system (LMS) [601]. In the system of FIG. 6, the expert model [602] portion of the intelligent tutoring system (ITS) is a data component which is instantiated with item and sequence rankings based on expert behavior. The pedagogy model [603] is instantiated with sequence and item selections, i.e., groupings and sequences appropriate for various skill levels in a particular competency. The domain knowledge [604] comprises information related to the various competencies that might be presented to the learner, such as an overall question bank, multimedia content, and instructional articles. Those components would then interact with the learner model [201], to control the information presented to the learner. The expert model [602] would provide potential groupings and sequences for the information that could be presented to the learner. The pedagogy model [603] would indicate which sequences and selections should be made based on the specific skill level of the learner, that skill level being derived from the learner model [201]. Then, the actual information would be provided from the domain knowledge [604]. The specific content elements which make up the domain knowledge [604] could be expressed in an extensible markup language (XML)-based format, and use metadata tags to indicate the attributes of any of the specific elements (e.g., competency area, difficulty level of questions, learning system of material, or other attributes). These tags might be used, either alone or in combination with information provided from the pedagogy model [603], to determine what information to provide to a learner in light of the characteristics of the learner (e.g., skill level at various competencies) as reflected in the learner model [201].

Figure 3:
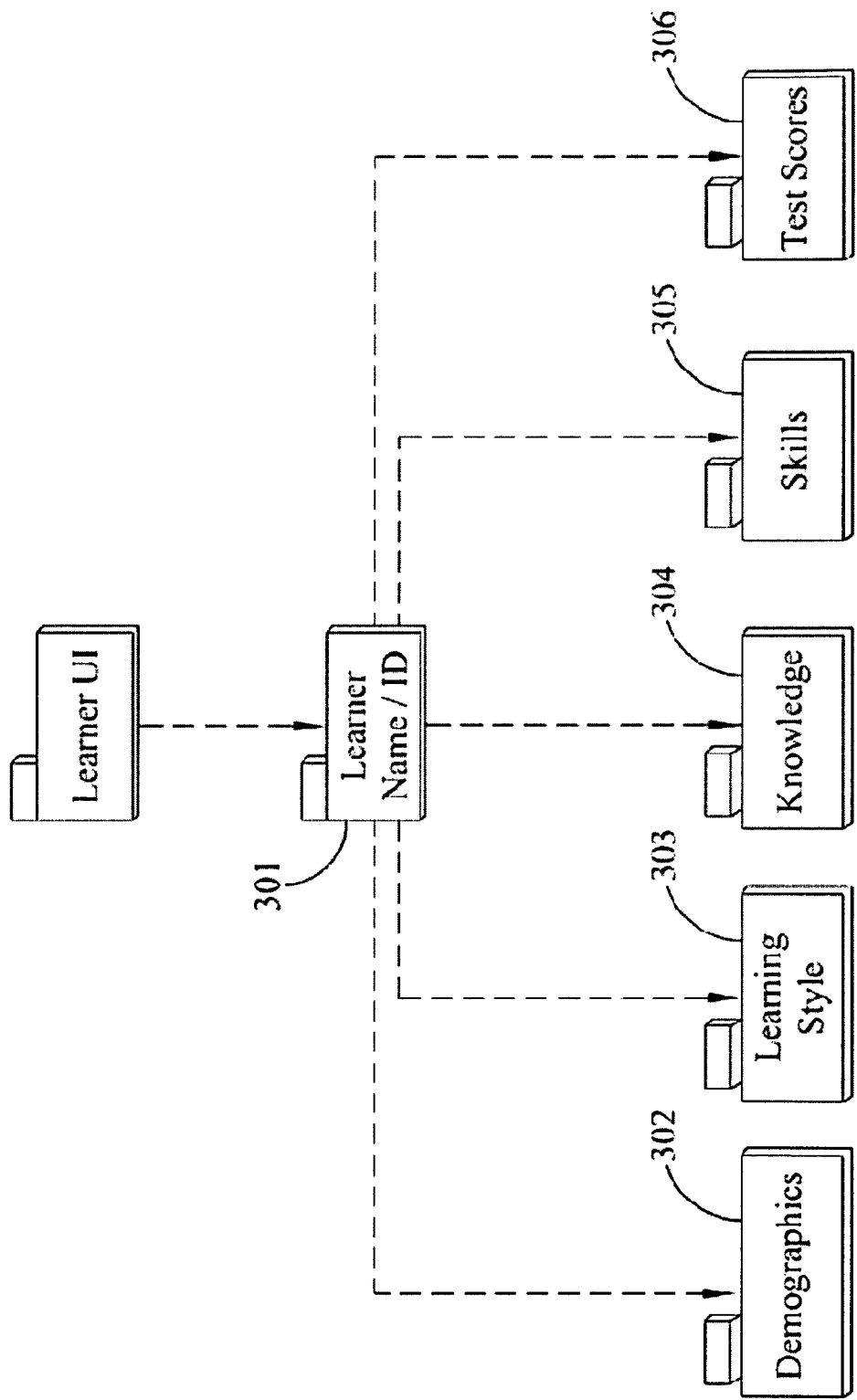
FIG. 3 depicts a high level view of a potential set of associations between different types of information relevant to a learner.
Figure 4:
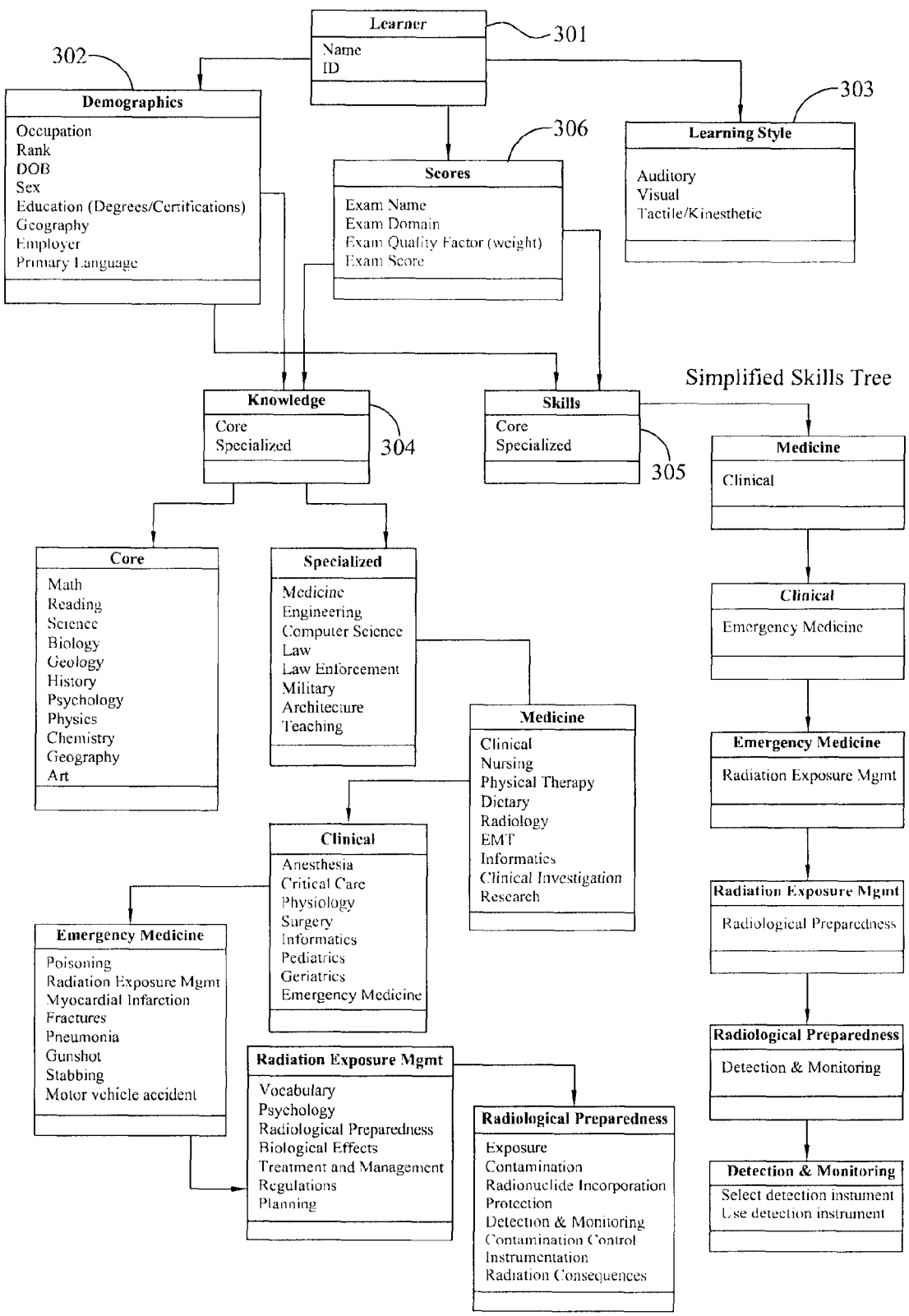
FIG. 4. shows an example of potential associations between types of data within a competency database.
Figure 7:
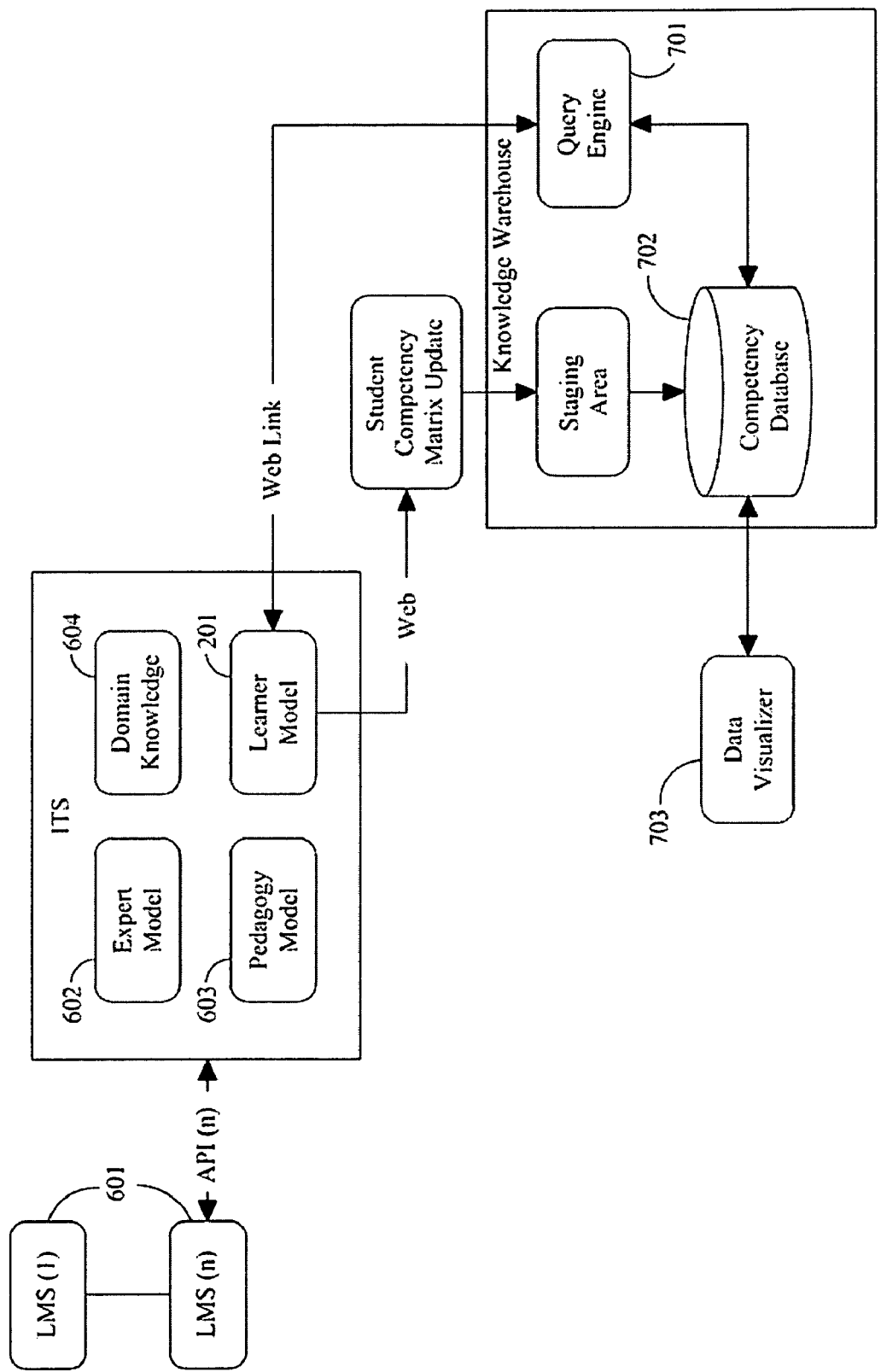
FIG. 7 depicts how a knowledge warehouse can be implemented as an extension to an intelligent tutoring system.

Turning now to FIG. 7, that figure depicts how a knowledge warehouse can be implemented as an extension to an intelligent tutoring system such as depicted in FIG. 6. As shown in FIG. 7, an intelligent tutoring system can utilize a query engine to obtain information for a learner model [201]. The query engine [701] can be implemented as a software process configured to retrieve data from a competency database [702] for a student. The information in the competency database [702] can be organized in a variety of manners. For example, the information in the competency database [702] can be represented in the form of on-line analytical processing (OLAP) cubes indexed by competency metadata. Specific illustrations of potential organizations for information in the competency database [702] are given in FIGS. 3-4 and 5a-c. FIG. 3 shows a high level view of a potential set of associations between different types of information relevant to a learner. For example, as shown in FIG. 3 a record for a learner could be uniquely determined by a learner name or ID [301]. Then, the record for that learner could include information regarding the learner's demographics [302], learning style [303], knowledge [304], skills [305], and test scores [306]. FIG. 4 shows a more detailed example of potential associations between types of data (e.g., those depicted in FIG. 3) within a competency database [702]. FIGS. 5a-5c show an alternative structure which could be used in the organization of data in a competency database [702]. Referring specifically to FIGS. 4 and 5a-c, it should be understood that, though those figures depict organization in knowledge domains related to radiation incidents, it is not required that a competency database [702] be devoted to information regarding radiation incidents, or that it be devoted to a particular knowledge domain at all. For example, as shown in FIG. 4, radiation exposure management could be only one entry in a general subject such as emergency medicine, which itself could be a nested entry in the general knowledge structure. While it is possible that some competency databases [702] might be organized for specific domains, in other implementations, a competency database [702] might be structured according to a general purpose organizational scheme. In such a case, different curricula might use techniques such as assigning different weights to different areas of the competency database [702] when assigning values to particular types of knowledge, thereby allowing the same database to be used as a general purpose tool in a variety of domains, rather than simply in domains related to radiation incidents, as shown in FIGS. 5a-5c.

Figure 8:
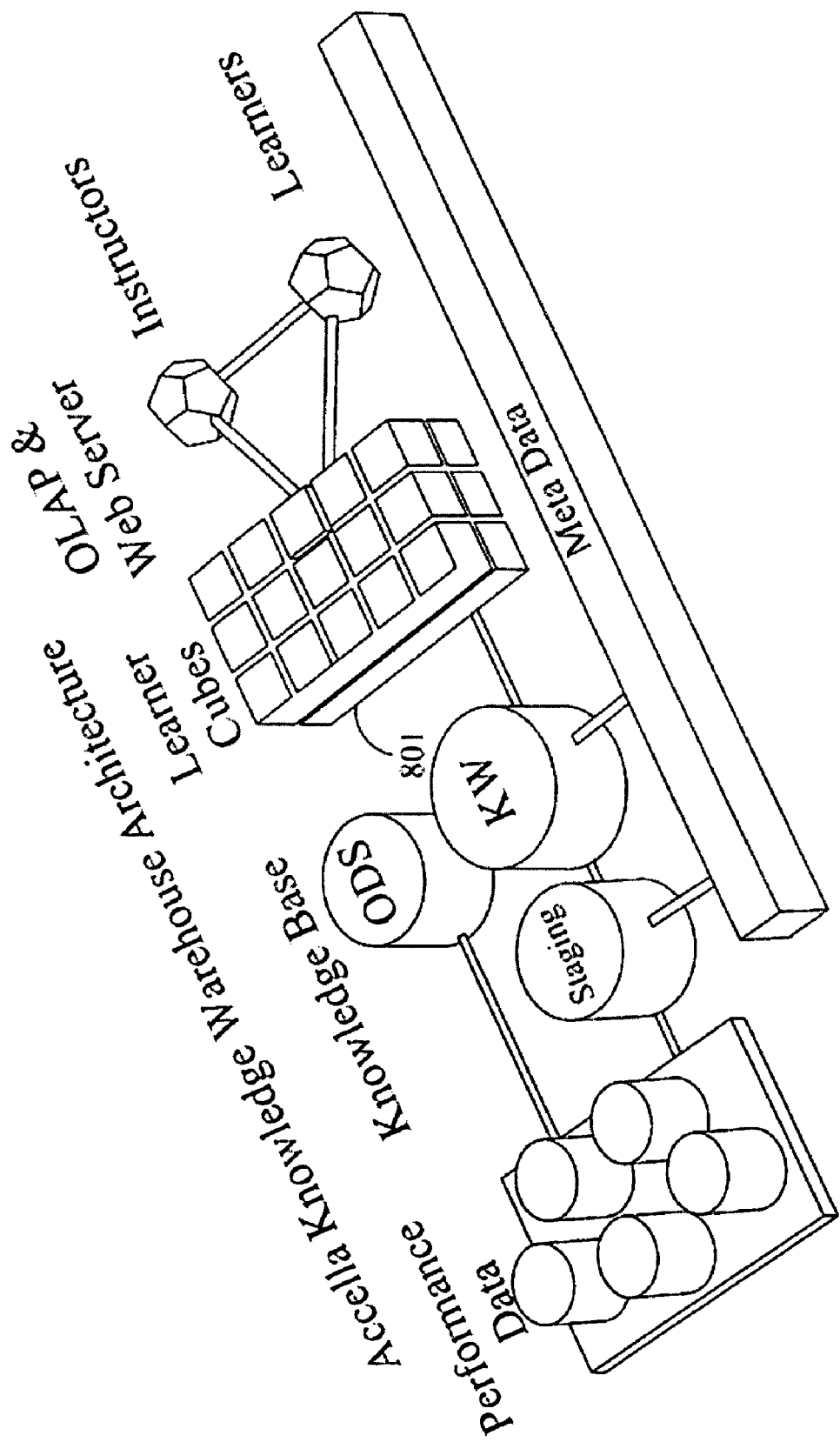
FIG. 8 depicts a view of potential components of a knowledge warehouse.

Returning to the discussion of FIG. 7, another aspect of certain knowledge databases which could be implemented by those of ordinary skill in the art in light of this disclosure is the ability to update information in the competency database [702] based on input received from a learner. Such updates might take place on a variety of schedules, for example, inputs received from a user might be propagated back to the competency database [702] in real time, might only be propagated back based on the occurrence of some event (e.g., completion of a module, session, or curriculum) or using some combined approach. The actual back propagation might be performed, for example, by using metadata for the competency database [702] to define processing operations which would be performed on raw data before that data could be incorporated. Examples of such processing operations include cleaning raw data (e.g., applying rules for allowable values, such as that age is a numerical value between 1 and 99, that a test score must be between 0 and 100%, etc) as well as transforming raw data by, for example, performing sorting, lookup, and calculations required to ensure quality, accuracy and compatibility of data accumulated from a variety of sources (e.g., transforming date of birth from MM/DD/YYYY format to DD/MM/YYYY format, converting a test result from a percentage to a z-score, etc). Also, as shown in FIG. 7, some implementations might include a visualizer [703], which could be used to provide a graphic interface to information maintained in the knowledge warehouse—for example, by providing an aggregate view of the contents of the competency database [702]. Of course, it should be understood that the representation provided in FIG. 7, along with the discussion above, is not intended to imply limitations on the potential implementations of this disclosure, or any claims included in this application or any applications which claim priority from this application. As an example of a further variation, consider the architecture shown in FIG. 8, which provides an alternative view of a knowledge warehouse, including OLAP cubes [801] storing information about particular students. Accordingly, the discussion of the knowledge warehouse set forth herein should be understood to be illustrative only, and not limiting.

Using approaches such as those set forth above, it is possible to provide a general purpose intelligent tutoring system add-on to a learning management system. As shown in FIG. 7, various components can be configured in a pluggable manner (e.g., a knowledge warehouse can interact with an intelligent tutoring system over a network, an intelligent tutoring system can interact with an appropriate learning management system through an application programming interface). This could allow for creation of a server-based intelligent tutoring system which allows dynamic sequencing of content for a learning management system without requiring that a model for a learner be constructed de novo for a particular LMS, or that data for that learner be collected independently for each individual curriculum. Rather, the learner model could be read into the intelligent tutoring system in real time from a knowledge warehouse, while data could be stored in a general purpose data organization in the content database, allowing a variety of different LMSes and/or curricula to be deployed without requiring retooling or data recreation. Of course, it is also possible that a toolset could be implemented to allow integration between a learning management system and the various components which might be used in conjunction with such a system. For example, standards could be created for metadata described previously to facilitate integration between different aspects of the system. Similarly, an implementation of certain aspects of the technology described herein might include published standard learner model vectors, and access mechanisms for various components of the system.

While the above discussion focused on how the disclosure of this application could be implemented in the context of an intelligent tutoring system, it should be understood that the techniques described herein are not limited to being so implemented. As certain implementations can be designed to be domain independent, extensible, standards-based, scalable, and modular, those implementations could be applied in a broad variety of settings beyond intelligent tutoring. For example, infrastructure and tools such as described herein can be applied to traditional didactic teaching, job placement, career planning, and practice-based experience tracking. Accordingly, the protection provided to the inventors by this document should not be limited to the material explicitly disclosed. Instead, such protection should be understood to be defined by the claims, when the terms in those claims which are explicitly defined in the "Summary" section under the "Explicit Definition" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definition" heading in the "Summary" section and the broadest reasonable interpretation as provided by a general purpose dictionary, the interpretation provided by the explicit definitions under the "Explicit Definitions" heading in the "Summary" section and broadest reasonable interpretation as provided by a general purpose dictionary shall control, and the inconsistent usage of terms in the specification shall have no effect.

What is claimed is:

1. A method of automatically selecting educational content to present to a student and storing information about the student's educational achievement comprising:
    a) using a set of computer executable instructions stored in local memory on a computer, causing the computer to execute a retrieval module to retrieve a competency record for the student from a database, wherein said competency record comprises a set of data indicating said student's knowledge in a plurality of competencies, and wherein retrieving the competency record for the student comprises storing said set of data in the computer's local memory;
    b) using the set of computer executable instructions, causing the computer to execute a transition module to determine a set of educational content for said student based on a comparison of a predicted skill level for the student indicated by a first predictive model comprising a nonlinear polynomial student model and a level for said set of educational content in a first competency from said plurality of competencies, wherein said level is retrieved from metadata associated with said set of educational content, wherein the nonlinear polynomial student model:
        (i) comprises an equation having a degree of at least three, and
        (ii) indicates the predicted skill level based on time spent by the student in instruction on the first competency;
    c) using the set of computer executable instructions, causing the computer to execute an evaluation module to dynamically select a plurality of questions assessing knowledge in said first competency for presentation to said student;
    d) using the set of computer executable instructions, causing the computer to execute a normalization module to perform a cleaning operation and a transformation operation on a set of evaluation data, wherein said set of evaluation data is based on input received from said student in response to the presentation of the plurality of questions; and
    e) using the set of computer executable instructions, causing the computer to execute an update module to modify the set of data stored in the computer's local memory to reflect the set of evaluation data and the cleaning and transformation operations performed by the normalization module and to propagate the modification to the set of data back to the database.

2. The method of claim 1 wherein the first predictive model comprises a polynomial vector student model.

3. The method of claim 1, wherein:
    a) performing said cleaning operation comprises applying a rule for allowable values to said set of evaluation data;

b) performing said transformation operation comprises converting a test result from said set of evaluation data into a z-score; and c) the cleaning operation and the transformation operation are indicated in the metadata associated with the set of educational content.

4. A method of automatically selecting educational content to present to a student and storing information about the student's educational achievement comprising:

a) using a set of computer executable instructions stored in local memory on a computer, causing the computer to execute a retrieval module to retrieve a competency record for the student from a database, wherein said competency record comprises a set of data indicating said student's knowledge in a plurality of competencies, and wherein retrieving the competency record for the student comprises storing said set of data in the computer's local memory;

b) using the set of computer executable instructions, causing the computer to execute a transition module to determine a set of educational content for said student based on a comparison of a predicted skill level for the student indicated by a first predictive model comprising a nonlinear polynomial student model and a level for said set of educational content in a first competency from said plurality of competencies, wherein said level is retrieved from metadata associated with said set of educational content, wherein the nonlinear polynomial student model:
(i) comprises an equation having a degree of at least three, and
(ii) indicates the predicted skill level based on time spent by the student in instruction on the first competency;

c) using the set of computer executable instructions, causing the computer to execute an evaluation module to dynamically select a plurality of questions assessing knowledge in said first competency for presentation to said student;

d) using the set of computer executable instructions, causing the computer to execute a normalization module to perform a cleaning operation and a transformation operation on a set of evaluation data, wherein said set of evaluation data is based on input received from said student in response to the presentation of the plurality of questions;

e) using the set of computer executable instructions, causing the computer to execute an update module to modify the set of data stored in the computer's local memory to reflect the set of evaluation data and the cleaning and transformation operations performed by the normalization module and to propagate the modification to the set of data back to the database, wherein the set of evaluation data is used, during presentation of the set of educational content to the student, to update the first predictive model; and f) during presentation of the set of educational content, the updated first predictive model indicating a second predicted skill level for the student.

5. A method of automatically selecting educational content to present to a student and storing information about the student's educational achievement comprising:

a) using a set of computer executable instructions stored in local memory on a computer, causing the computer to execute a retrieval module to retrieve a competency record for the student from a database, wherein said competency record comprises a set of data indicating said student's knowledge in a plurality of competencies, and wherein retrieving the competency record for the student comprises storing said set of data in the computer's local memory;

b) using the set of computer executable instructions, causing the computer to execute a transition module to determine a set of educational content for said student based on a comparison of a predicted skill level for the student indicated by a first predictive model comprising a nonlinear polynomial student model and a level for said set of educational content in a first competency from said plurality of competencies, wherein said level is retrieved from metadata associated with said set of educational content, wherein the nonlinear polynomial student model:
(i) comprises an equation having a degree of at least three, and
(ii) indicates the predicted skill level based on time spent by the student in instruction on the first competency;

c) using the set of computer executable instructions, causing the computer to execute an evaluation module to dynamically select a plurality of questions assessing knowledge in said first competency for presentation to said student;

d) using the set of computer executable instructions, causing the computer to execute a normalization module to perform a cleaning operation and a transformation operation on a set of evaluation data, wherein said set of evaluation data is based on input received from said student in response to the presentation of the plurality of questions;

e) using the set of computer executable instructions, causing the computer to execute an update module to modify the set of data stored in the computer's local memory to reflect the set of evaluation data and the cleaning and transformation operations performed by the normalization module and to propagate the modification to the set of data back to the database, wherein the set of evaluation data is used, during presentation of the set of educational content to the student, to update the first predictive model;

f) during presentation of the set of educational content, the updated first predictive model indicating a second predicted skill level for the student; and g) determining a second set of educational content to present to the student based on a comparison of a third predicted skill level for the student indicated by a second predictive model and a level for the second set of educational content in a second competency from the plurality of competencies, wherein the first predictive model indicates predicted skill levels for the student in the first competency, and wherein the second predictive model indicates predicted skill levels for the student in the second competency.

* * * * *